(12) United States Patent
Imai

(10) Patent No.: US 8,030,866 B2
(45) Date of Patent: Oct. 4, 2011

(54) MOTOR DRIVE CIRCUIT, FAN MOTOR, ELECTRONIC DEVICE, AND NOTEBOOK PERSONAL COMPUTER

(75) Inventor: Toshiyuki Imai, Oizumi-machi (JP)

(73) Assignees: Sanyo Semiconductor Co., Ltd., Gunma (JP); Semiconductor Components Industries, LLC, Phoenix, AZ (US)

( * ) Notice: Subject to any disclaimer, the term of this patent is extended or adjusted under 35 U.S.C. 154(b) by 539 days.

(21) Appl. No.: 12/274,715

(22) Filed: Nov. 20, 2008

(65) Prior Publication Data
US 2009/0140677 A1   Jun. 4, 2009

(30) Foreign Application Priority Data

Nov. 21, 2007 (JP) ................................. 2007-302075

(51) Int. Cl.
*H02P 6/08* (2006.01)
(52) U.S. Cl. .......... 318/400.29; 318/400.06; 318/400.38
(58) Field of Classification Search ............. 318/400.01, 318/400.04, 400.06, 400.29, 400.37, 400.38
See application file for complete search history.

(56) References Cited

U.S. PATENT DOCUMENTS

| | | | | |
|---|---|---|---|---|
| 4,308,466 A | * | 12/1981 | Cushman et al. | 327/423 |
| 6,229,273 B1 | * | 5/2001 | Kelly et al. | 318/400.29 |
| 6,956,343 B2 | * | 10/2005 | Berroth et al. | 318/400.03 |
| 7,271,993 B2 | * | 9/2007 | Plojhar et al. | 361/154 |
| 2003/0076063 A1 | * | 4/2003 | Fu | 318/560 |

FOREIGN PATENT DOCUMENTS

JP   2004-166379   6/2004

* cited by examiner

*Primary Examiner* — Bentsu Ro
(74) *Attorney, Agent, or Firm* — SoCal IP Law Group LLP; Steven C. Sereboff; John E. Gunther

(57) ABSTRACT

A motor drive circuit comprising: first and second transistors connected in series, a voltage of a connection-point therebetween being a drive-voltage applied to one end of a motor coil; an operational amplifier for controlling the transistors such that the drive-voltage is a voltage according to a difference between first and second control voltages; a switch circuit for driving the transistors such that the motor coil is in an undriven state regardless of control by the operational amplifier when a pulse-signal is at one logic level, and driving the transistors based on the control when the pulse-signal is at the other logic level; and an auxiliary drive circuit for driving the transistors to increase the drive-voltage for a predetermined time period shorter than a time period of the pulse signal being at the other level regardless of the control, when the pulse-signal changes from the one level to the other.

6 Claims, 7 Drawing Sheets

US 8,030,866 B2

MOTOR DRIVE CIRCUIT, FAN MOTOR, ELECTRONIC DEVICE, AND NOTEBOOK PERSONAL COMPUTER

CROSS-REFERENCE TO RELATED APPLICATION

This application claims the benefit of priority to Japanese Patent Application No. 2007-302075, filed Nov. 21, 2007, of which full contents are incorporated herein by reference.

BACKGROUND OF THE INVENTION

1. Field of the Invention

The present invention relates to a motor drive circuit, a fan motor, electronic equipment, and a notebook computer.

2. Description of the Related Art

In electronic equipment such as a notebook computer, a fan motor is used for cooling a heat-producing component such as a processor. In the fan motor, a drive voltage applied to a motor coil is controlled according to a signal indicating a rotational position of the motor, so that the motor runs at the desired rotation. In a case where the drive voltage applied to the motor coil is thus controlled, change of the drive voltage may be moderated for silencing of noise, reduction of flyback voltage, etc. (see Japanese Publication Laid-Open No. 2004-166379.)

When using the fan motor to cool a component, a cooling effect can be enhanced by increasing rotational speed of the motor, i.e., rotational speed of a fan. However, constantly keeping the fan at high rotation speed causes problems such as an increase in power consumption, fan noise. Therefore, the rotational speed of the fan is often controlled to be at a necessary level by intermittently driving the motor according to an amount of heat released by a component to be cooled, an amount of processing, etc.

FIG. 6 is a diagram showing an example of a configuration of a motor drive circuit that drives a single phase fan motor. In a motor drive circuit 100, drive voltages $V_{OUT1}$ and $V_{OUT2}$, which are applied to terminals OUT1 and OUT2 connected to a motor coil L, are controlled based on voltages $V_{H1}$ and $V_{H2}$ opposite in phase from each other according to the rotational position of the motor that are output by a Hall element 110. The voltage of a connection point between a P-channel MOSFET 112 and an N-channel MOSFET 113 connected in series is denoted as the drive voltage $V_{OUT1}$. An operational amplifier 115 controls a voltage applied to gates of the P-channel MOSFET 112 and the N-channel MOSFET 113 so that the drive voltage $V_{OUT1}$ becomes a voltage according to a difference between the voltages $V_{H1}$ and $V_{H2}$ output by the Hall element 110. The drive voltage $V_{OUT2}$ is controlled to have a phase opposite to that of the drive voltage $V_{OUT1}$ based on the voltages $V_{H1}$ and $V_{H2}$ output by the Hall element 110. Accordingly, in the motor drive circuit 100, the drive voltages $V_{OUT1}$ and $V_{OUT2}$ are controlled to change moderately, so that silencing of noise, reduction of flyback voltage, etc., are realized.

The motor coil L is intermittently controlled according to a PWM signal output by a PWM signal output circuit 120. Specifically, when the PWM signal is at H level, the P-channel MOSFETs 122 and 123 are OFF, and therefore, the drive voltage $V_{OUT1}$ is controlled by the operational amplifier 115, however, when the PWM signal is at L level, the P-channel MOSFETs 122 and 123 are ON, and therefore, the P-channel MOSFET 112 is OFF, the N-channel MOSFET 113 is ON, and the drive voltage $V_{OUT1}$ changes to the L level regardless of control by the operational amplifier 115. Similarly, the drive voltage $V_{OUT2}$ is also controlled according to the PWM signal. Accordingly, the motor coil L is in a state of not being driven while the PWM signal is at L level. In other words, in the motor drive circuit 100, the rotational speed of the fan can be controlled by changing duty of the PWM signal according to circumstances.

FIG. 7 is a diagram showing an example of change of the drive voltage $V_{OUT1}$ according to the PWM signal. When the PWM signal changes from the H level to the L level, the P-channel MOSFET 112 is turned OFF, the N-channel MOSFET 113 is turned ON, and the drive voltage $V_{OUT1}$ quickly changes to the L level. On the other hand, when the PWM signal changes from the L level to the H level, the drive voltage $V_{OUT1}$ changes under a feedback control by the operational amplifier 115, and therefore, time is required according to frequency characteristics of the operational amplifier 115 to reach a target level according to the difference between the voltages $V_{H1}$ and $V_{H2}$ output by the Hall element 110.

In a fan motor that cools a processor or the like of a notebook computer, the rotational speed of the fan is changed according to circumstances, and in such circumstances that little heat is released such as a standby state, sleep mode, etc., in order to reduce the power consumption, it is desirable to operate the fan at a low rotation speed as much as possible. Therefore, in a case of the motor drive circuit 100, in order to operate the fan at the low rotation speed, it is necessary to reduce a duty ratio of the H level of the PWM signal, i.e., a pulse width of the PWM signal.

However, in the motor drive circuit 100 as illustrated in FIG. 7, time is required according to the frequency characteristics of the operational amplifier 115 for the drive voltage $V_{OUT1}$ to reach the target after the PWM signal changes from the L level to the H level. Therefore, as the pulse width of the PWM signal is reduced, the PWM signal may change to the L level and the drive voltage $V_{OUT1}$ may undesirably change to the L level before reaching the target level. Accordingly, the rotational speed of the fan cannot be linearly controlled according to the duty of the PWM signal especially in a range of the low rotation speed, and therefore, it is difficult to operate the fan at a sufficiently required low rotation speed.

SUMMARY OF THE INVENTION

A motor drive circuit according to an aspect of the present invention, comprises: a first transistor and a second transistor connected in series, a voltage of a connection point between the first transistor and the second transistor being a drive voltage applied to one end of a motor coil; an operational amplifier configured to control the first transistor and the second transistor such that the drive voltage is a voltage according to a difference between a first control voltage and a second control voltage for controlling driving of the motor coil; a switch circuit configured to drive the first transistor and the second transistor such that the motor coil is in a state of not being driven regardless of control by the operational amplifier when a pulse signal for intermittently driving the motor coil is at one logic level, and drive the first transistor and the second transistor based on the control by the operational amplifier when the pulse signal is at the other logic level; and an auxiliary drive circuit configured to drive the first transistor and the second transistor to increase the drive voltage for a predetermined time period shorter than a time period during which the pulse signal is at the other logic level regardless of the control by the operational amplifier, when the pulse signal changes from the one logic level to the other logic level.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
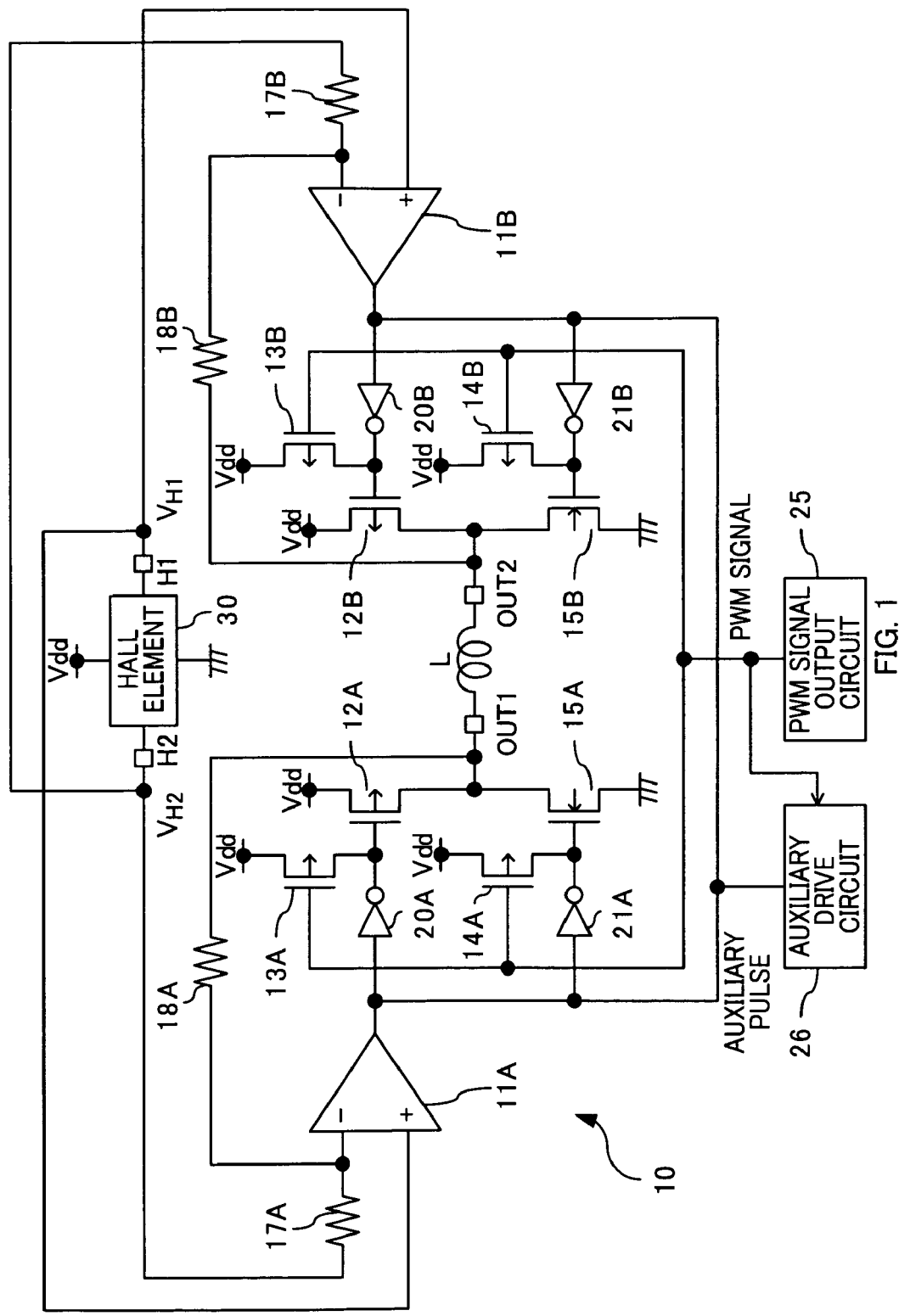
FIG. 1 illustrates a configuration of a motor drive circuit that is an embodiment of the present invention.

FIG. 1 illustrates a configuration of a motor drive circuit that is an embodiment of the present invention. A motor drive circuit 10 is included in a fan motor for cooling a heat-producing component (a device to be cooled) such as a processor in electronic equipment such as a notebook computer, and is used for driving the motor for rotating a fan for cooling, for example.

The motor drive circuit 10 according to an embodiment of the present invention is a circuit that drives a single phase fan motor and includes operational amplifiers 11A and 11B, P-channel MOSFETs 12A to 14A and 12B to 14B, N-channel MOSFETs 15A and 15B, resistors 17A, 17B, 18A, and 18B, inverting circuits 20A, 20B, 21A, and 21B, a PWM signal output circuit 25, and an auxiliary drive circuit 26. According to an embodiment of the present invention, the motor drive circuit 10 is integrated, a motor coil L is connected between terminals OUT1 and OUT2, and a Hall element 30 that outputs a voltage $V_{H1}$ (first control voltage) and a voltage $V_{H2}$ (second control voltage) according to a rotational position of the motor is connected between terminals H1 and H2. The voltages $V_{H1}$ and $V_{H2}$ are sinusoidally-varying voltages and are opposite in phase from each other.

The operational amplifier 11B, the P-channel MOSFETs 12B to 14B, the N-channel MOSFET 15B, the resistors 17B and 18B, and the inverting circuits 20B and 21B provided on an output terminal OUT2 side have a configuration similar to that on an output terminal OUT1 side, except that an input relationship of the voltages $V_{H1}$ and $V_{H2}$ output by the Hall element 30 to the operational amplifier 11B is opposite to that thereof to the operational amplifier 11A.

The voltage $V_{H1}$ is applied to a + input terminal of the operational amplifier 11A, and the voltage $V_{H2}$ is applied to a − input terminal of the operational amplifier 11A via the resistor 17A (first resistor.) The operational amplifier 11A includes a feedback circuit where the terminal OUT1 and the − input terminal are connected via the resistor 18A (second resistor.) In other words, the operational amplifier 11A performs a feedback control so that a drive voltage $V_{OUT1}$ applied to the terminal OUT1 becomes a voltage obtained by amplifying the difference between the voltages $V_{H1}$ and $V_{H2}$ by a gain according to a resistance ratio of the resistors 17A and 18A. A drive voltage $V_{OUT2}$ applied to the terminal OUT2 and controlled by the operational amplifier 11B has a phase opposite to that of the drive voltage $V_{OUT1}$.

The P-channel MOSFET 12A (first transistor) and the N-channel MOSFET 15A (second transistor) are connected in series between a source voltage Vdd and a ground voltage, and a connection point is connected to the terminal OUT1. An output voltage of the operational amplifier 11A is applied to gates of the P-channel MOSFET 12A and the N-channel MOSFET 15A via the inverting circuits 20A and 21A. Each of the inverting circuits 20A and 21A is a circuit for inverting the output voltage of the operational amplifier 11A with respect to a midpoint voltage (Vdd/2, for example), to be output. Accordingly, in a case of the voltage $V_{H1}$>the voltage $V_{H2}$, the output voltage of the operational amplifier 11A is increased, a current in the P-channel MOSFET 12A is increased while a current in the N-channel MOSFET 15A is decreased, and the drive voltage $V_{OUT1}$ is increased. On the other hand, in a case of the voltage $V_{H1}$<the voltage $V_{H2}$, the output voltage of the operational amplifier 11A is decreased, the current in the P-channel MOSFET 12A is decreased while the current in the N-channel MOSFET 15A is increased, and the drive voltage $V_{OUT1}$ is decreased. Under such a control, the drive voltage $V_{OUT1}$ is a voltage according to the difference between the voltages $V_{H1}$ and $V_{H2}$.

The PWM signal output circuit 25 outputs a PWM signal (pulse signal) for intermittently driving the motor coil L. According to an embodiment of the present invention, when the PWM signal is at L level, the P-channel MOSFETs 13A, 13B, 14A, and 14B (switch circuit) are ON. When the P-channel MOSFETs 13A, 13B, 14A, and 14B are ON, regardless of the output voltage of the operational amplifiers 11A and 11B, the P-channel MOSFETs 12A and 12B are OFF, the N-channel MOSFETs 15A and 15B are ON, and both of the drive voltages $V_{OUT1}$ and $V_{OUT2}$ are at L level, so that, the motor coil L is in a state of not being driven. On the other hand, when the PWM signal is at H level, the P-channel MOSFETs 13A, 13B, 14A and 14B are OFF, and the drive voltages $V_{OUT1}$ and $V_{OUT2}$ are controlled by the operational amplifiers 11A and 11B, so that the motor coil L is driven by the difference between the voltages $V_{OUT1}$ and $V_{OUT2}$. In other words, the rotational speed of the motor can be increased by increasing the duty ratio of the H level of the PWM signal, and the rotational speed of the motor can be decrease by decreasing the duty ratio.

The auxiliary drive circuit 26 outputs an auxiliary pulse for increasing responsiveness of the drive voltages $V_{OUT1}$ and $V_{OUT2}$ when the PWM signal changes from the L level to the H level and control of the voltages $V_{OUT1}$ and $V_{OUT2}$ by the operational amplifiers 11A and 11B is resumed. In other words, when the PWM signal changes to the H level, such control by the operational amplifiers 11A and 11B that the drive voltages $V_{OUT1}$ and $V_{OUT2}$ change from voltages of the L level to those of a level according to the difference between the voltages $V_{H1}$ and $V_{H2}$, is resumed. At this time, an auxiliary pulse is used for reducing an amount of time which it takes the voltages $V_{OUT1}$ and $V_{OUT2}$ to reach the target level. The auxiliary pulse according to an embodiment of the present invention is a signal that is at H level for a predetermined time period from a time when the PWM signal changes from the L level to the H level, and whose pulse width is shorter than that of the PWM signal. Accordingly, while the auxiliary pulse is at H level, the P-channel MOSFET 12A and the N-channel MOSFET 15A are controlled such that the current in the P-channel MOSFET 12A is increased and the current in the N-channel MOSFET 15A is decreased, and thus, the drive voltage $V_{OUT1}$ is increased more quickly than the drive voltage $V_{OUT1}$ is increased when being controlled only by the operational amplifier 11A. A similar description may be made for the drive voltage $V_{OUT2}$.

Figure 2:
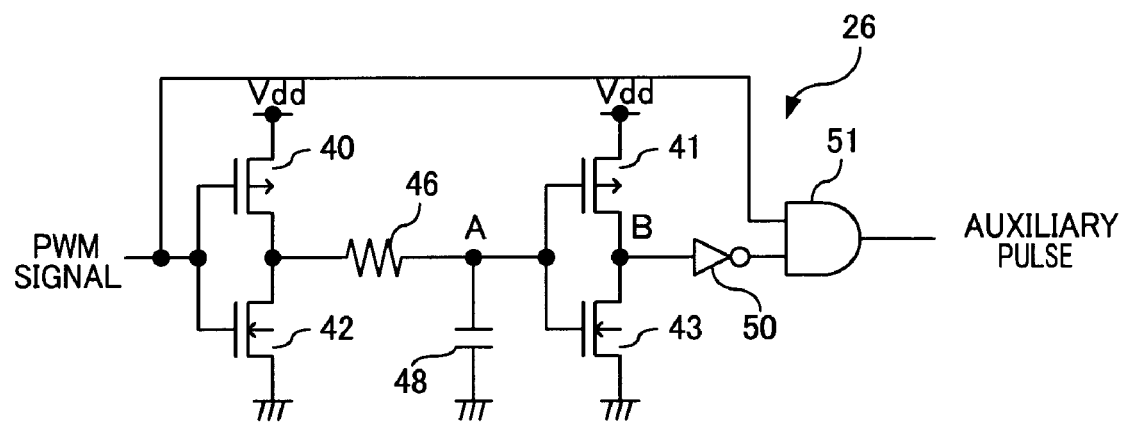
FIG. 2 illustrates a configuration example of an auxiliary drive circuit.

FIG. 2 illustrates a configuration example of the auxiliary drive circuit 26. The auxiliary drive circuit 26 includes P-channel MOSFETs 40 and 41, N-channel MOSFETs 42 and 43, a resistor 46, a capacitor 48, a NOT circuit 50, and an AND circuit 51. The P-channel MOSFET 40 and the N-channel MOSFET 42 make up an inverter. The P-channel MOSFET 41 and the N-channel MOSFET 43 also make up an inverter.

Figure 3:
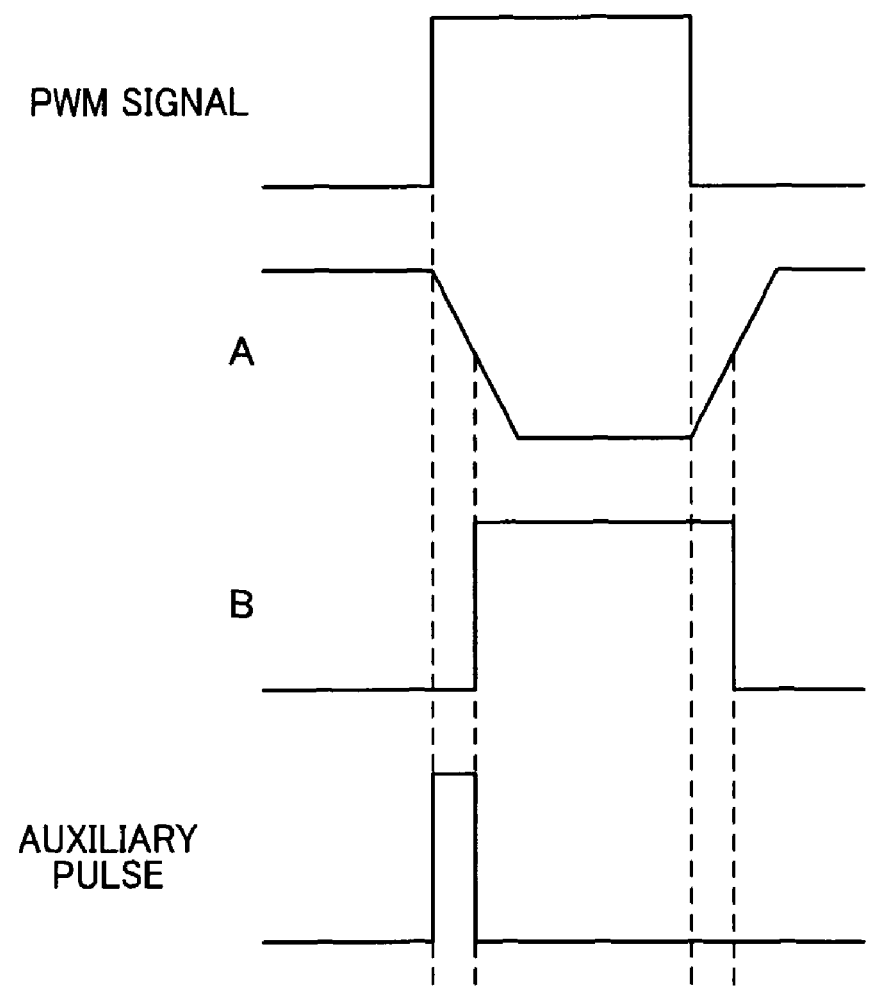
FIG. 3 illustrates an example of an operation of an auxiliary drive circuit.

As illustrated in FIG. 3, when the PWM signal changes from the L level to the H level, an output of the inverter made up of the P-channel MOSFET 40 and the N-channel MOSFET 42 changes to the L level, and therefore a voltage of an A point is decreased with a time constant according to a resistance value of the resistor 46 and capacitance of the capacitor 48. When the voltage of the A point reaches a threshold voltage of the inverter made up of the P-channel MOSFET 41 and the N-channel MOSFET 43, a voltage of a B point changes to the H level. When the PWM signal changes from the H level to the L level, the voltage of the A point is increased according to the time constant, and when the voltage of the A point reaches the threshold voltage of the inverter made up of the P-channel MOSFET 41 and the N-channel MOSFET 43, the voltage of the B point changes to the L level. In other words, the P-channel MOSFETs 40 and 41, the N-channel MOSFETs 42 and 43, the resistor 46, and the capacitor 48 make up a delay circuit, and a signal (delayed pulse signal) which is obtained by delaying the PWM signal by a predetermined time period is output from the B point. The NOT circuit 50 and the AND circuit 51 make up an auxiliary pulse output circuit. A signal obtained by inverting the signal output from the B point in the NOT circuit 50 and the PWM signal are input to the AND circuit 51, and thus, an auxiliary pulse is generated, which is at H level for the predetermined time period from the time when the PWM signal changes from the L level to the H level.

Figure 4:
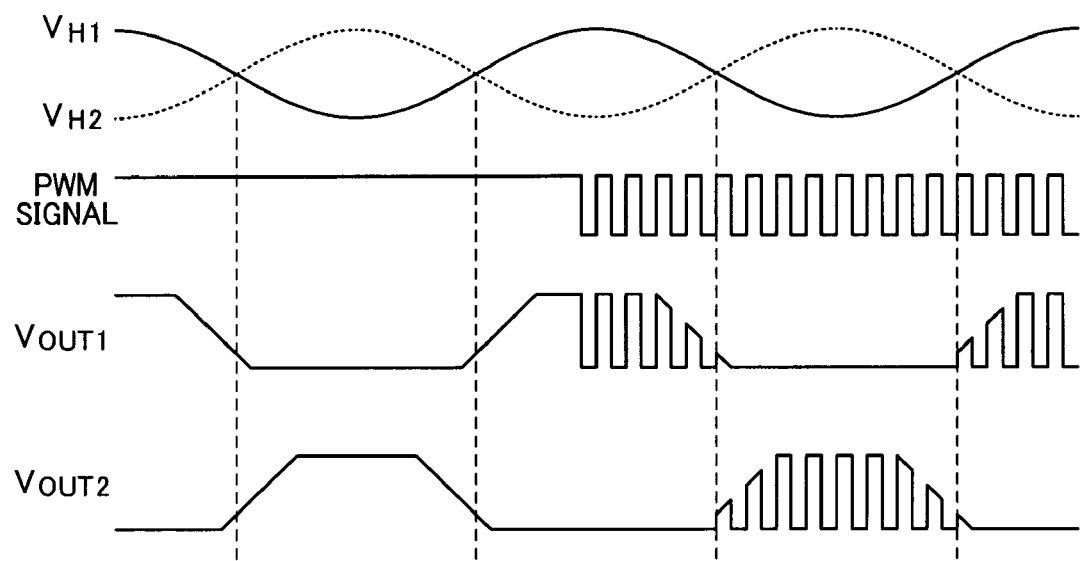
FIG. 4 illustrates an example of an operation of a motor drive circuit.

FIG. 4 illustrates an example of an operation of the motor drive circuit 10. During a period of time in which the PWM signal is maintained at H level, the drive voltages $V_{OUT1}$ and $V_{OUT2}$ to be applied to both ends of the motor coil L are controlled by the operational amplifiers 11A and 11B to become a voltage according to the difference between the voltages $V_{H1}$ and $V_{H2}$ output by the Hall element 30, so that the motor coil L is driven. During a period of time during which the PWM signal changes in a pulse-like form, when the PWM signal changes from the H level to the L level, the drive voltages $V_{OUT1}$ and $V_{OUT2}$ are changed to the L level regardless of the control by the operational amplifiers 11A and 11B, and thus, the motor coil L is in the state of not being driven. During the period of time during which the PWM signal changes in the pulse-like form, when the PWM signal changes from the L level to the H level, the drive voltages $V_{OUT1}$ and $V_{OUT2}$ is returned to the target level according to the difference between the voltages $V_{H1}$ and $V_{H2}$ under the control of the operational amplifiers 11A and 11B. In other words, the motor coil L is intermittently driven according to the duty ratio of the H level of the PWM signal.

Figure 5:
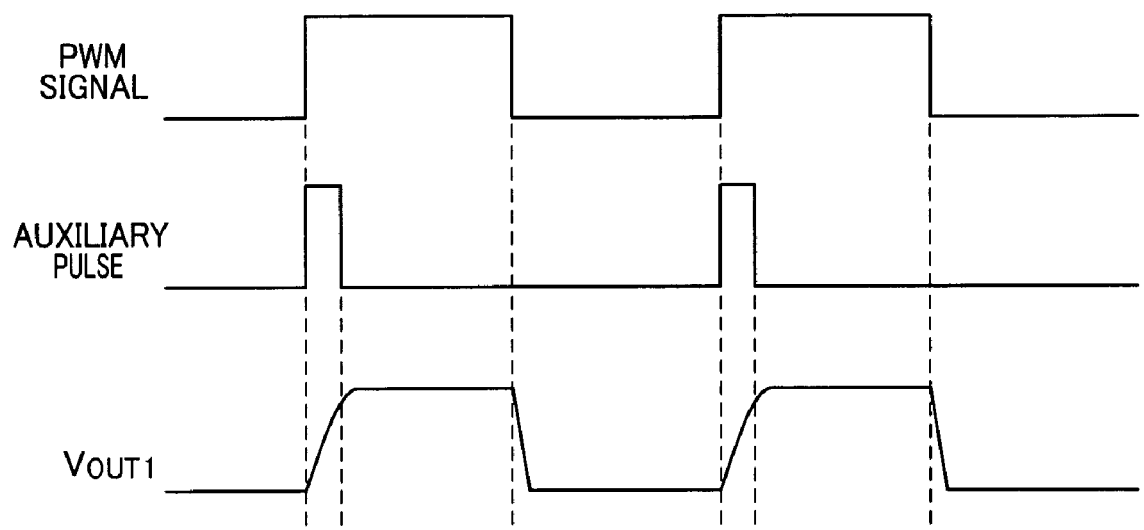
FIG. 5 illustrates an example of a change of a drive voltage according to a PWM signal and an auxiliary pulse.
Figure 6:
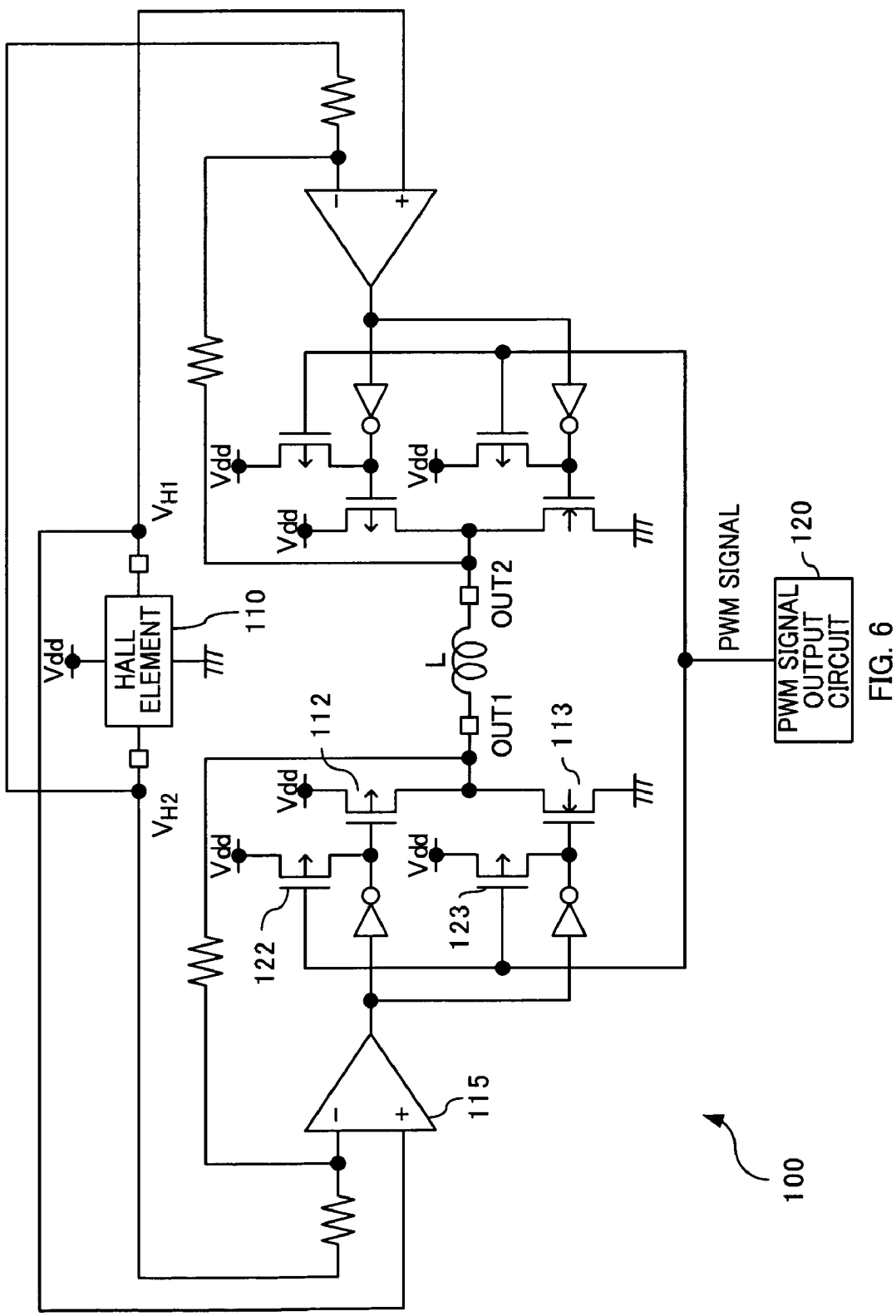
FIG. 6 illustrates an example of a configuration of a motor drive circuit that drives a single phase fan motor.
Figure 7:
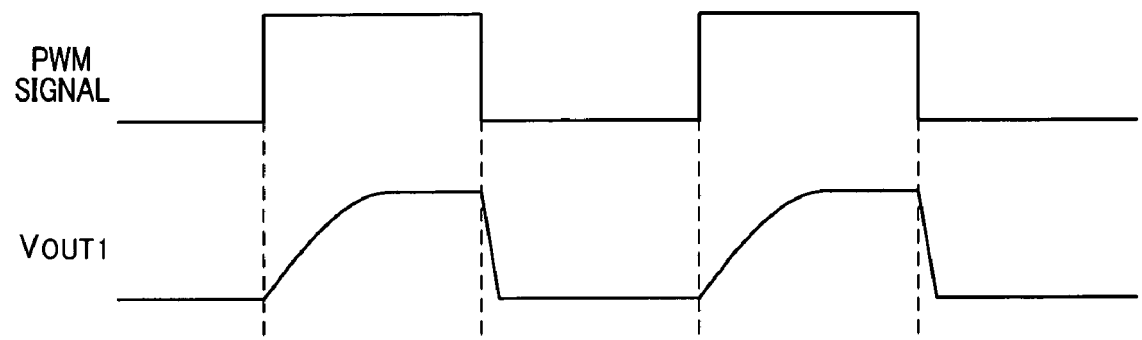
FIG. 7 illustrates an example of a change of a drive voltage according to a PWM signal.

FIG. 5 illustrates an example of a change of the drive voltage according to the PWM signal and the auxiliary pulse. As described above, when the PWM signal changes from the L level to the H level, the auxiliary pulse is output from the auxiliary drive circuit 26. During a short period of time during which the auxiliary pulse is at H level, the P-channel MOSFET 12A and the N-channel MOSFET 15A are controlled such that the current in the P-channel MOSFET 12A is increased while the current in the N-channel MOSFET 15A is decreased, and thus, the drive voltage $V_{OUT1}$ is increased more quickly than the drive voltage $V_{OUT1}$ is increased when being controlled only by the operational amplifier 11A. When the auxiliary pulse changes to the L level, the drive voltage $V_{OUT1}$ is controlled by the operational amplifier 11A to reach the target level from a level at which the drive voltage $V_{OUT1}$ is increased by the auxiliary pulse. A similar description may be made for the drive voltage $V_{OUT2}$. Thus, in a case where the motor coil L is intermittently driven, when changing the motor coil L from the state of not being driven to a state of being driven, the amount of time which it takes the voltages $V_{OUT1}$ and $V_{OUT2}$ to reach the target level can be reduced due to the auxiliary pulse.

As described above, the motor drive circuit 10 according to an embodiment of the present invention is described. In the motor drive circuit 10, when the PWM signal changes from the L level to the H level, the auxiliary pulse having a short pulse width is generated, to help the drive voltages $V_{OUT1}$ and $V_{OUT2}$ reach the target level. Accordingly, the drive voltages $V_{OUT1}$ and $V_{OUT2}$ can reach the target level more quickly than the drive voltages $V_{OUT1}$ and $V_{OUT2}$ can reach when being controlled only by the operational amplifiers 11A and 11B. Therefore, a pulse width of the PWM signal, i.e., a switching interval when intermittently driving the motor coil L, can be shortened; and the rotational speed of the motor can be linearly controlled even in a range of a low speed. Also, the power consumption is high during the period of time until when the drive voltages $V_{OUT1}$ and $V_{OUT2}$ reach the target level, and therefore, shortening this period enables reduction of the power consumption.

As illustrated in FIG. 2, the auxiliary pulse can be generated based on the PWM signal and a signal obtained by delaying the PWM signal by a predetermined time period.

By using such a motor drive circuit 10, in the case where a small amount of heat is released by a heat-producing component such as a processor in electronic equipment such as a notebook computer, the rotational speed of the fan can sufficiently be reduced, and thus, the power consumption can be reduced.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:
1. A motor drive circuit comprising:
  a first transistor and a second transistor connected in series, a voltage of a connection point between the first transistor and the second transistor being a drive voltage applied to one end of a motor coil;
  an operational amplifier configured to control the first transistor and the second transistor such that the drive voltage is a voltage according to a difference between a first control voltage and a second control voltage for controlling driving of the motor coil;
  a switch circuit configured to drive the first transistor and the second transistor such that the motor coil is in a state of not being driven regardless of control by the operational amplifier when a pulse signal for intermittently driving the motor coil is at one logic level, and drive the first transistor and the second transistor based on the control by the operational amplifier when the pulse signal is at the other logic level; and an auxiliary drive circuit configured to drive the first transistor and the second transistor to increase the drive voltage for a predetermined time period shorter than a time period during which the pulse signal is at the other logic level regardless of the control by the operational amplifier, when the pulse signal changes from the one logic level to the other logic level.

2. The motor drive circuit according to claim 1, wherein the auxiliary drive circuit includes:

a delay circuit configured to generate a delayed pulse signal obtained by delaying the pulse signal by the predetermined time period; and an auxiliary pulse output circuit configured to output an auxiliary pulse signal for increasing the drive voltage, for the predetermined time period from a time when the pulse signal changes from the one logic level to the other logic level, based on the pulse signal and the delayed pulse signal.

3. The motor drive circuit according to claim 2, wherein the operational amplifier includes:

one input terminal to which the first control voltage is input;

the other input terminal to which the second control voltage is input via a first resistor;

a feedback circuit that connects the other input terminal to the connection point between the first and second transistors via a second resistor; and an output terminal to which the auxiliary pulse signal output from the auxiliary pulse output circuit is input.

4. A fan motor, comprising:

a fan;

a motor configured to drive the fan; and a motor drive circuit configured to drive the motor, the motor drive circuit including a first transistor and a second transistor connected in series, a voltage of a connection point between the first transistor and the second transistor being a drive voltage applied to one end of a motor coil;

an operational amplifier configured to control the first transistor and the second transistor such that the drive voltage is a voltage according to a difference between a first control voltage and a second control voltage for controlling driving of the motor coil;

a switch circuit configured to drive the first transistor and the second transistor such that the motor coil is in a state of not being driven regardless of control by the operational amplifier when a pulse signal for intermittently driving the motor coil is at one logic level, and drive the first transistor and the second transistor based on the control by the operational amplifier when the pulse signal is at the other logic level; and an auxiliary drive circuit configured to drive the first transistor and the second transistor to increase the drive voltage for a predetermined time period shorter than a time period during which the pulse signal is at the other logic level regardless of the control by the operational amplifier, when the pulse signal changes from the one logic level to the other logic level.

5. Electronic equipment, comprising:

a fan;

a motor configured to drive the fan;

a motor drive circuit configured to drive the motor; and a cooled device to be cooled by the fan, the motor drive circuit including:

a first transistor and a second transistor connected in series, a voltage of a connection point between the first transistor and the second transistor being a drive voltage applied to one end of a motor coil;

an operational amplifier configured to control the first transistor and the second transistor such that the drive voltage is a voltage according to a difference between a first control voltage and a second control voltage for controlling driving of the motor coil;

a switch circuit configured to drive the first transistor and the second transistor such that the motor coil is in a state of not being driven regardless of control by the operational amplifier when a pulse signal for intermittently driving the motor coil is at one logic level, and drive the first transistor and the second transistor based on the control by the operational amplifier when the pulse signal is at the other logic level; and an auxiliary drive circuit configured to drive the first transistor and the second transistor to increase the drive voltage for a predetermined time period shorter than a time period during which the pulse signal is at the other logic level regardless of the control by the operational amplifier, when the pulse signal changes from the one logic level to the other logic level.

6. A notebook computer, comprising:

a fan;

a motor configured to drive the fan;

a motor drive circuit configured to drive the motor; and a processor configured to be cooled by the fan, the motor drive circuit including:

a first transistor and a second transistor connected in series, a voltage of a connection point between the first transistor and the second transistor being a drive voltage applied to one end of a motor coil;

an operational amplifier configured to control the first transistor and the second transistor such that the drive voltage is a voltage according to a difference between a first control voltage and a second control voltage for controlling driving of the motor coil;

a switch circuit configured to drive the first transistor and the second transistor such that the motor coil is in a state of not being driven regardless of control by the operational amplifier when a pulse signal for intermittently driving the motor coil is at one logic level, and drive the first transistor and the second transistor based on the control by the operational amplifier when the pulse signal is at the other logic level; and an auxiliary drive circuit configured to drive the first transistor and the second transistor to increase the drive voltage for a predetermined time period shorter than a time period during which the pulse signal is at the other logic level regardless of the control by the operational amplifier, when the pulse signal changes from the one logic level to the other logic level.

* * * * *